(12) United States Patent
Braun et al.

(10) Patent No.: US 10,117,113 B2
(45) Date of Patent: Oct. 30, 2018

(54) BEAMFORMING APPARATUSES, METHODS AND COMPUTER PROGRAMS FOR A BASE STATION TRANSCEIVER AND A MOBILE TRANSCEIVER

(71) Applicant: Alcatel Lucent, Boulogne Billancourt (FR)

(72) Inventors: Volker Braun, Stuttgart (DE); Cornelis Hoek, Stuttgart (DE); Federico Boccardi, Vimercate (IT); Hardy Halbauer, Stuttgart (DE); Paolo Baracca, Stuttgart (DE)

(73) Assignee: Alcatel Lucent, Boulogne Billancourt (FR)

( * ) Notice: Subject to any disclaimer, the term of this patent is extended or adjusted under 35 U.S.C. 154(b) by 122 days.

(21) Appl. No.: 15/105,939

(22) PCT Filed: Nov. 20, 2014

(86) PCT No.: PCT/EP2014/075105
§ 371 (c)(1),
(2) Date: Jun. 17, 2016

(87) PCT Pub. No.: WO2015/090829
PCT Pub. Date: Jun. 25, 2015

(65) Prior Publication Data
US 2016/0323757 A1    Nov. 3, 2016

(30) Foreign Application Priority Data

Dec. 18, 2013 (EP) .................................. 13306767

(51) Int. Cl.
*H04L 12/50* (2006.01)
*H04W 16/28* (2009.01)
(Continued)

(52) U.S. Cl.
CPC .......... *H04W 16/28* (2013.01); *H04B 7/0617* (2013.01); *H04B 7/0695* (2013.01);
(Continued)

(58) Field of Classification Search
CPC ...................................................... H04W 16/40
(Continued)

(56) References Cited

U.S. PATENT DOCUMENTS

| 8,731,555 B2 | 5/2014 | Yokoyama |
| 2004/0014429 A1 | 1/2004 | Guo |

(Continued)

FOREIGN PATENT DOCUMENTS

| CN | 101472346 A | 7/2009 |
| EP | 2 536 227 A2 | 12/2012 |

(Continued)

OTHER PUBLICATIONS

International Search Report for PCT/EP2014/075105 dated Feb. 10, 2015.

*Primary Examiner* — Dang Ton
(74) *Attorney, Agent, or Firm* — Fay Sharpe LLP

(57) ABSTRACT

Embodiments provide beamforming apparatuses, methods and a computer programs for a base station transceiver and a mobile transceiver. An apparatus (10) operable in a base station transceiver (100) of a mobile communication system comprises a transceiver module (12) comprising interfaces to a plurality (15) of antennas. The transceiver module (12) is operable to subdivide the plurality (15) of antennas in a plurality of subgroups using the interfaces, and to form a first beam pattern (16) using one or more antennas of a subgroup. The apparatus (10) further comprises a control module (14), which is operable to transmit a synchronization signal using the transceiver module (12) and the first beam
(Continued)

pattern (16). The control module (14) is further operable to receive a response signal after transmission of the synchronization signal from a mobile transceiver (200) using the transceiver module (12), to determine a second beam pattern (18) based on the response signal from the mobile transceiver (200). The second beam pattern (18) has a higher antenna gain than the first beam pattern (16), and to transmit a signal to the mobile transceiver (200) using the second beam pattern (18) and the transceiver module (12). An apparatus (20) operable in a mobile transceiver (200) of a mobile communication system comprises a transceiver module (22) comprising interfaces to a plurality of antennas (25), and a control module (24) operable to determine a first set of beam patterns (26) based on the plurality of antennas (25), to receive a signal from a base station transceiver (100) using a first beam pattern from the first set of beam patterns (26) using the transceiver module (22). The control module (24) is further operable to determine a second set of beam patterns (28) based on the plurality of antennas (25), the second set of beam patterns (28) comprising more beam patterns than the first set of beam patterns (26), and to transmit a signal to the base station transceiver (100) using a second beam pattern from the set of second beam patterns (28) and using the transceiver module (22).

13 Claims, 7 Drawing Sheets

(51) Int. Cl.
*H04B 7/06* (2006.01)
*H04B 7/08* (2006.01)
*H04W 72/04* (2009.01)
*H04W 74/08* (2009.01)

(52) U.S. Cl.
CPC ............. *H04B 7/086* (2013.01); *H04B 7/088* (2013.01); *H04W 72/0446* (2013.01); *H04W 74/0833* (2013.01)

(58) Field of Classification Search
USPC .......................................................... 370/329
See application file for complete search history.

(56) References Cited

U.S. PATENT DOCUMENTS

| | | | |
|---|---|---|---|
| 2009/0170514 | A1 | 7/2009 | Yokoyama |
| 2011/0205969 | A1 | 8/2011 | Ahmad et al. |
| 2013/0272263 | A1 | 10/2013 | Pi et al. |
| 2013/0301454 | A1 | 11/2013 | Seol et al. |
| 2013/0308562 | A1 | 11/2013 | Matin et al. |
| 2016/0241323 | A1* | 8/2016 | Ko ........................ H04B 7/0691 |

FOREIGN PATENT DOCUMENTS

| | | |
|---|---|---|
| JP | 2004-507151 A | 3/2004 |
| JP | 2008-278076 A | 11/2008 |
| JP | 2009-159214 A | 7/2009 |
| JP | 2013-520937 A | 6/2013 |
| WO | WO 2002/015432 A1 | 2/2002 |
| WO | WO 2013/012295 A2 | 1/2013 |

\* cited by examiner

BEAMFORMING APPARATUSES, METHODS AND COMPUTER PROGRAMS FOR A BASE STATION TRANSCEIVER AND A MOBILE TRANSCEIVER

TECHNICAL FIELD

Embodiments relate to beamforming apparatuses, methods and computer programs for a base station transceiver and a mobile transceiver, more particularly but not exclusively, to efficient beamforming in mobile communication systems.

BACKGROUND

This section introduces aspects that may be helpful in facilitating a better understanding of the invention(s). Accordingly, the statements of this section are to be read in this light and are not to be understood as admissions about what is in the prior art or what is not in the prior art.

With the increasing demand for data services, wireless systems tend to use more and more bandwidth and higher carrier frequencies. For example, Fifth Generation (5G) wireless access may be expected to embrace mm-Wave frequencies to provide multi-Gbps data rates, typically in femto, pico, or metro cell type of deployments. Free space propagation or path loss increases at higher frequencies and may be compensated by exploiting antenna directivity. This may be achieved using high gain adaptive BeamForming (BF) solutions. Adaptive beam-steering may be implemented by analog phase shifters, fully digitally, e.g. by equipping each antenna with a fully digital transmit/receive path, or as hybrid digital/analog solutions, e.g. by connecting each digital transmit/receive path to a set of antennas via analog phase shifters. Base station antenna arrays may include, e.g. 8, 16, 32, 64 or more antenna elements, e.g. tiny horn antenna elements.

Document US 2013/0301454 A1 describes a communication method and apparatus using analog and digital hybrid beamforming. Document US 2013/0272263 A1 discloses selecting time, frequency and spatial processing parameters for communications between a base station and a mobile station by transmitting synchronization signals in multiple slices of a wireless transmission sector for the base station.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections.

Various embodiments provide an apparatus, a method and a computer program for a base station transceiver and an apparatus, a method and a computer program for a mobile transceiver. Embodiments may provide an efficient concept for acquisition of a mobile transceiver by a base station transceiver setting up a user-specific beamformed link. Embodiments may provide efficient acquisition in a mm-Wave access system, which may be considered critical due to limited BF gains, which may be available at the beginning of such acquisition.

Embodiments provide an apparatus, which is operable in a base station transceiver of a mobile communication system. The apparatus comprises a transceiver module, which comprises interfaces to a plurality of antennas, which may correspond to transmit and/or receive antennas. The transceiver module is operable to subdivide the plurality of antennas in a plurality of subgroups using the interfaces. The transceiver module is further operable to form a first beam pattern using one or more antennas of a subgroup. The apparatus further comprises a control module, which is operable to transmit a synchronization signal using the transceiver module and the first beam pattern. The control module is further operable to receive a response signal after transmission of the synchronization signal from a mobile transceiver using the transceiver module. The control module is further operable to determine a second beam pattern based on the response signal from the mobile transceiver, and the control module is operable to transmit a signal to the mobile transceiver using the second beam pattern and the transceiver module. The second beam pattern has a higher antenna gain than the first beam pattern. For example, the second beam pattern may use more antennas than the first beam pattern.

Embodiments may enable a base station transceiver to increase BF gain after reception of a response to the synchronization signal from the mobile transceiver. In other words a base station transceiver may use reduced BF gain to receive a response signal from the mobile transceiver and base higher gain BF on said response.

In some embodiments an antenna may use an individual beam pattern covering a sector of the base station transceiver. The first beam pattern may correspond to a subsector of the sector. The control module may be operable to transmit the synchronization signal using the individual beam pattern of the antenna or the first beam pattern. In other words, in some embodiments the synchronization signal may be transmitted in a sector or a subsector in the sector. Some embodiments may allow exploiting BF gains for the synchronization signal and/or its response from the mobile transceiver using subsectorization. Some embodiments may use different synchronization signals in different subsectors, such that the mobile transceiver may distinguish different subsectors by the synchronization signal. In turn the mobile transceiver may use different response signals, e.g. by transmitting a response indication on subsector specific radio resources, such that the base station transceiver may determine which subsector's synchronization signal was received by the mobile transceiver from the radio resource carrying the response. Embodiments may enable efficient subsector detection.

In some embodiments the control module may be operable to transmit the synchronization signal using the individual beam pattern of the antenna, e.g. the synchronization signal may be transmitted across the entire sector. For example, subsectors may be used for receiving the response signal from the mobile transceiver such that at least some BF gain may be realized for the response signal. In some embodiments an antenna may use an individual beam pattern covering a sector of the base station transceiver. The transceiver module may be operable to form a first set of beam patterns comprising subsectors covering the sector and the first beam pattern may correspond to such a subsector.

In some embodiments the control module may be operable to transmit synchronization signals for multiple subsectors of the sector. Additionally or alternatively, the control module may be operable to determine a subsector from the first set of beam pattern, which provides a highest receive signal quality of the response signal of the mobile transceiver. The control module may be operable to select the subsector with the highest receive signal quality as the first beam pattern. In other words, the control module may scan a set of subsectors in order to determine the subsector with the highest receive signal quality for the response signal, which may then be selected as first beam pattern. Embodiments, may enable efficient subsector determination.

The control module may be operable to receive a random access preamble signal from mobile transceiver using the first beam pattern. The control module may be further operable to transmit a random access response to the mobile transceiver using the first beam pattern and to receive a pilot signal from the mobile transceiver. The control module may be further operable to determine the second beam pattern based on the pilot signal and to transmit a subsequent signal using the second beam pattern. Hence, in some embodiments a pilot or reference signal transmitted by the mobile transceiver and received at the base station may be used to determine the second beam pattern.

In some embodiments the control module may be operable to receive one or more random access preamble signals from the mobile transceiver using the first beam pattern. The control module may be operable to determine the second beam pattern based on the one or more random access preamble signals and to transmit a random access response to the mobile transceiver using the second beam pattern. Hence, in some embodiments a random access preamble signal transmitted by the mobile transceiver and received at the base station may be used to determine the second beam pattern, which can then be used for transmitting a random access response to the mobile transceiver.

The transceiver module may in some further embodiments be operable to use analog BF to form the first beam pattern and the control module may be operable to use digital BF to form the second beam pattern. Embodiments may allow efficient combination of analog and digital BF. In some embodiments the transceiver module may be operable to use analog BF to form the first beam pattern and the second beam pattern. The control module may be operable to select a beam pattern at the transceiver module. Embodiments may therefore enable efficient utilization of analog BF.

The control module may be operable to iteratively determine the second beam pattern by subsequently evaluating increasingly narrower beam patterns. In other words, the control module may be operable to first select one wider beam pattern from a set of wider beam patterns and may then select a narrower beam pattern within the previously selected wider beam pattern. Subsequently the control module may select an even narrower beam pattern within the narrower beam pattern and so on. Embodiments may enable a hierarchical beam pattern selection and efficient beam selection.

In some embodiments the control module may be operable to receive the response signal to the synchronization signal from a mobile transceiver using the transceiver module in a first predefined time slot relative to the synchronization signal. The control module may be operable to transmit control data specific to the mobile transceiver using the transceiver module in a second predefined time slot different from the first time slot. Embodiments may enable efficient acquisition in a time multiplexed manner, e.g. in a time division duplex system.

Embodiments further provide an apparatus, which is operable in a mobile transceiver of a mobile communication system. The mobile transceiver is operable to carry out beamforming. The mobile transceiver apparatus comprises a transceiver module, which comprises interfaces to a plurality of antennas, which may correspond to transmit and/or receive antennas. The mobile transceiver apparatus comprises a control module, which is operable to determine a first set of beam patterns based on the plurality of antennas. The control module is further operable to receive a signal from a base station transceiver using a first beam pattern from the first set of beam patterns using the transceiver module. The control module is further operable to determine a second set of beam patterns based on the plurality of antennas. The second set of beam patterns comprises more beam patterns than the first set of beam patterns. The control module is further operable to transmit a signal to the base station transceiver using the second beam pattern and using the transceiver module. Embodiments may enable efficient BF at a mobile transceiver.

In some embodiments the control module may be operable to receive a synchronization signal as the signal from a base station transceiver and to determine information related to radio resources for transmission of a random access preamble based on the synchronization signal. The control module may be further operable to transmit a random access preamble to the base station transceiver using the radio resources determined based on the synchronization signal.

In line with the above, in some embodiments, the control module may be operable to receive a synchronization signal as the signal from a base station transceiver using the first beam pattern from the first set of beam patterns using the transceiver module. The control module may be further operable to transmit a random access preamble to the base station transceiver using the second beam pattern and using the transceiver module. In some embodiments the control module may be operable to receive a synchronization signal as the signal from a base station transceiver using the first beam pattern from the first set of beam patterns using the transceiver module and to transmit a random access preamble to the base station transceiver using the first beam pattern and using the transceiver module. The control module may be further operable to receive a random access response using the first beam pattern and using the transceiver module, and to transmit a pilot signal using the second beam pattern and using the transceiver module.

Embodiments further provide a method for a base station transceiver of a mobile communication system. The method comprises subdividing a plurality of antennas in a plurality of subgroups, and forming a first beam pattern using one or more antennas of a subgroup. The method further comprises transmitting a synchronization signal using the first beam pattern, and receiving a response signal after the transmission of the synchronization signal from a mobile transceiver using the transceiver module. The method further comprises determining a second beam pattern based on the response signal from the mobile transceiver, and transmitting a signal to the mobile transceiver using the second beam pattern. The second beam pattern has a higher antenna gain than the first beam pattern.

Embodiments further provide a method for a mobile transceiver of a mobile communication system. The method comprises determining a first set of beam patterns based on a plurality of transmit and/or antennas, and receiving a signal from a base station transceiver using a first beam pattern from the first set of beam patterns. The method further comprises determining a second set of beam patterns based on the plurality of antennas. The second set of beam patterns comprises more beam patterns than the first set of beam patterns. The method further comprises transmitting a signal to the base station transceiver using the second beam pattern.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
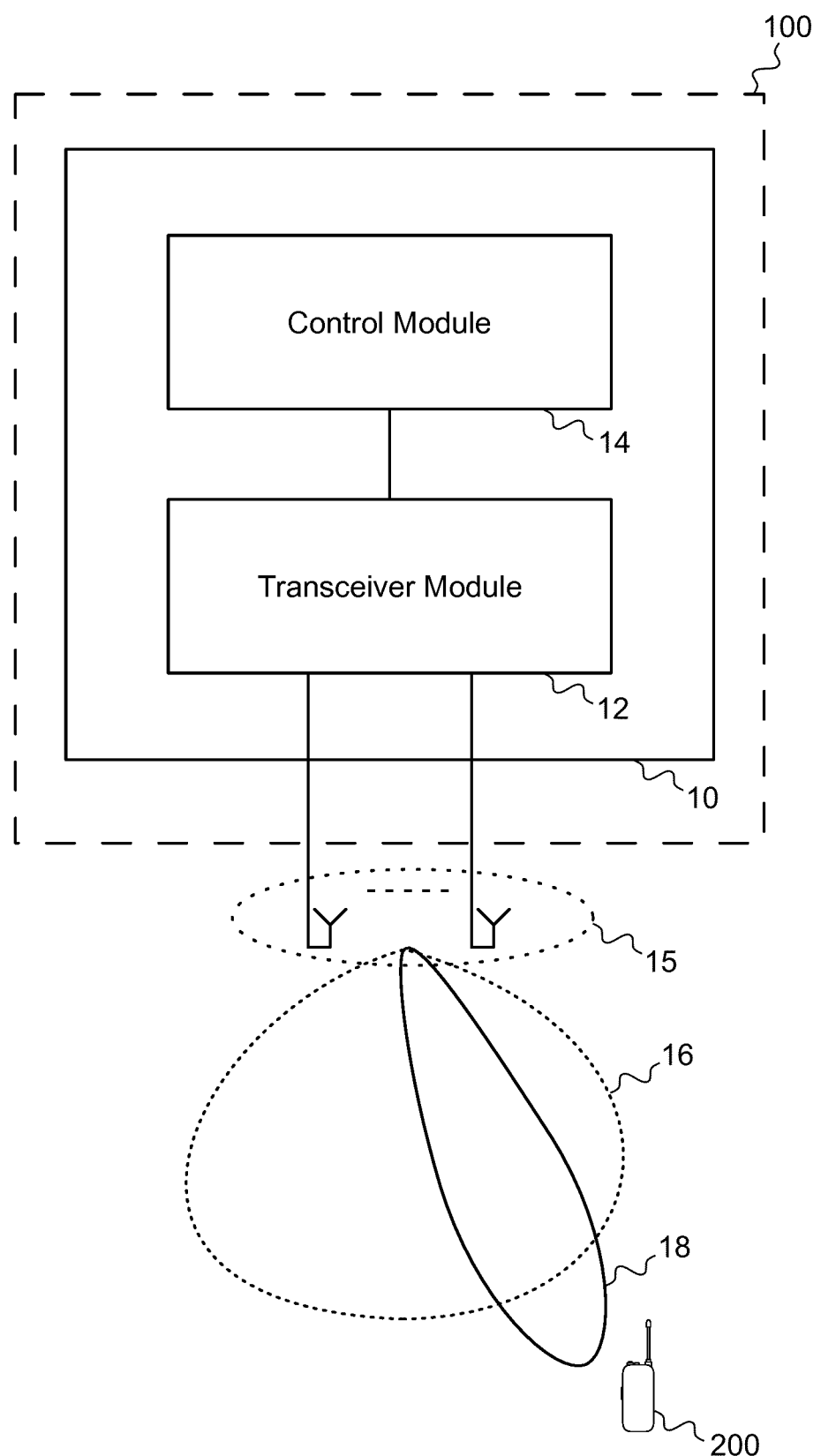
FIG. 1 illustrates a block diagram of an embodiment of an apparatus for a base station transceiver.

In the following some embodiments of apparatuses, methods and computer programs for base station transceivers and mobile transceivers will be described. FIG. 1 illustrates a block diagram of an embodiment of an apparatus 10 for a base station transceiver 100. In other words, the apparatus 10 may be adapted to or operable in a base station transceiver 100; the apparatus 10 may be operated or comprised in a base station transceiver 100. Embodiments may also provide a base station transceiver 100 comprising the apparatus 10. FIG. 1 further shows an embodiment (dashed lines) of a base station transceiver 100 comprising the apparatus 10. The base station transceiver 100 can be operative in a mobile communication system. In other words, the base station transceiver 100, its apparatus 10, respectively, can be adapted, operable, or configured to comply with the mobile communication system.

The mobile communication system may, for example, correspond to one of the Third Generation Partnership Project (3GPP)-standardized mobile communication networks, where the term mobile communication system is used synonymously to mobile communication network. The mobile or wireless communication system may correspond to, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Interoperability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable to communicate with one or more active mobile transceivers and a base station transceiver can be located in or adjacent to a coverage area of another base station transceiver, e.g. a macro cell base station transceiver or small cell base station transceiver. Hence, embodiments may provide a mobile communication system comprising one or more mobile transceivers and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, etc. A mobile transceiver may also be referred to as User Equipment (UE) or mobile in line with the 3GPP terminology.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a transmission point etc., which may be further subdivided in a remote unit and a central unit.

A mobile transceiver can be associated, camped on, or registered with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

In other words, in embodiments the mobile communication system may correspond to a HetNet, which utilizes different cell types, i.e. Closed Subscriber Group (CSG) cells and open cells, and cells of different sizes, as, for example, macro cells and small cells, where the coverage area of a small cell is smaller than the coverage area of a macro cell. A small cell may correspond to a metro cell, a micro cell, a pico cell, a femto cell, etc. Such cells are established by base station transceivers for which their coverage areas are determined by their transmission power and interference condition. In some embodiments a small cell's coverage area can at least partly be surrounded by the coverage area of a macro cell established by another base station transceiver. The small cells can be deployed to extend the capacity of the network. A metro cell may therefore be used to cover a smaller area than a macro cell, e.g. a metro cell may cover a street or a section in a metropolitan area. For a macro cell the coverage area may have a diameter in the order of one or more kilometers, for a micro cell the coverage area may have a diameter below a kilometer, and for a pico cell the coverage area may have a diameter below a 100 m. A femto cell may be the smallest cell and it may be used to cover a household or gate section at the airport, i.e. its coverage area may have a diameter below 50 m. Thus, a base station transceiver may also be referred to as cell.

As shown in FIG. 1, the base station transceiver apparatus 10 comprises a transceiver module 12, which further comprises interfaces to a plurality of antennas, which may correspond to transmit and/or receive antennas. The plurality of antennas is indicated in FIG. 1 by an array 15 of transmit/receive antennas connected to interfaces of the transceiver module 12. The transceiver module 12 may correspond to one or more transceiver devices, one or more transceiver units, any means for transceiving, i.e. receiving and/or transmitting etc., and it may comprise typical receiver and transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, etc.

In the embodiment depicted in FIG. 1 the transceiver module 12 is operable to subdivide the plurality of transmit/receive antennas 15 in a plurality of subgroups using the interfaces. Furthermore, the transceiver module 12 is operable to form a first beam pattern 16 using one or more transmit/receive antennas of a subgroup. The base station transceiver apparatus 10 further comprises a control module 14, which is coupled to the transceiver module 12. The control module 14 is operable to transmit a synchronization signal using the transceiver module 12 and the first beam pattern 16. The control module 14 is further operable to receive a response signal after transmission of the synchronization signal from a mobile transceiver 200 using the transceiver module 12. Furthermore, the control module 12 is operable to determine a second beam pattern 18 based on the response signal from the mobile transceiver 200. The second beam pattern 18 has a higher antenna gain than the first beam pattern 16. For example, the second beam pattern 18 may use more transmit/receive antennas than the first beam pattern 16. The control module 14 is further operable to transmit a signal to the mobile transceiver 200 using the second beam pattern 18 and the transceiver module 12. In FIG. 1 the first and second beam patterns 16 and 18 are depicted and it is also illustrated that the second beam pattern 18 may provide a higher antenna or BF gain than the first antenna pattern 16, and that the second beam pattern 18 may be narrower than the first beam pattern 16.

In embodiments the control module 14 may be implemented using one or more control units, control devices, any means for controlling, such as a processor, a computer or a programmable hardware component being operable with accordingly adapted software. In other words, the above described functions of the control module 14, may as well be implemented in software, which is then executed on one or more programmable hardware components. Such hardware components may comprise a general purpose processor, a Digital Signal Processor (DSP), a micro-controller, etc. The interfaces of the transceiver module 12, which are used to connect to the plurality 15 of transmit/receive antennas may correspond to any suitable interfaces, for example, a high frequency interface, using coaxial wires, in other embodiments at least some of the plurality 15 of antennas may be located at remote locations, such that the interfaces may correspond to optical interfaces to remotely located antennas, which would still allow the above described subgrouping and BF.

As has been mentioned above, embodiments make use of BF, which is to be understood as signal processing means to achieve defined or controlled superposition of the signals transmitted by the individual transmit/receive antennas. For example, a geometry of the plurality 15 of transmit/receive antennas may correspond to a linear antenna array, a circular antenna array, a triangular antenna array, any two-dimensional antenna array or field, or even an arbitrary antenna array, for as long as geometrical relations between the antenna elements are known or controlled. In some embodiments, the plurality 15 of antenna elements or transmit/receive antennas may correspond to a uniform linear antenna array, wherein the transmit/receive antennas are spaced uniformly, and wherein the distance between to antenna elements may correspond to, for example, half of a wavelength of the carrier frequency of the signals transmitted/received using these antennas. As known for BF, by providing phase shifted versions of the same signal to different antennas, constructive and destructive superposition of the transmitted signals may be achieved for different angular directions with respect to these antennas. The more antennas are used, the higher the overall beamforming gain and the narrower a beam that may be formed. In embodiments a transmit/receive antenna or a transmit/receive antenna element may use an individual beam pattern covering a sector or a cell of the base station transceiver 100, e.g. a 90° half power beam width antenna pattern to cover a 120° sector or cell.

In embodiments the first beam pattern 16 may correspond to a subsector of such a sector, and the control module 14 may be operable to transmit the synchronization signal using the individual beam pattern of the transmit/receive antenna or the first beam pattern 16. In other words, an individual antenna may correspond to an antenna having a certain beam width, for example having a half power beam width of 90°, 120°, etc. The individual beam pattern of a transmit/receive antenna may then influence the BF, as well as the first beam pattern 16. For example, the first beam pattern 16 may be formed using two antenna elements having a half power beam width of 120°. The control module 14 may be operable to transmit the synchronization signal using one single antenna, for example with the half power beam width of 120°, or the first beam pattern 16, which may be narrower than a full sector. Hence, in some embodiments the first beam pattern 16 may correspond to a subsector of a sector.

In some embodiments a transmit/receive antenna may use an individual beam pattern covering a sector of the base station transceiver 100. The transceiver module 12 may be operable to form a first set of beam patterns comprising subsectors covering the sector and the first beam pattern 16 may correspond to a subsector. That is to say the first beam pattern 16 may correspond to one of a set of subsectors, wherein the set of subsectors covers an entire sector of the base station transceiver 100.

Figure 2:
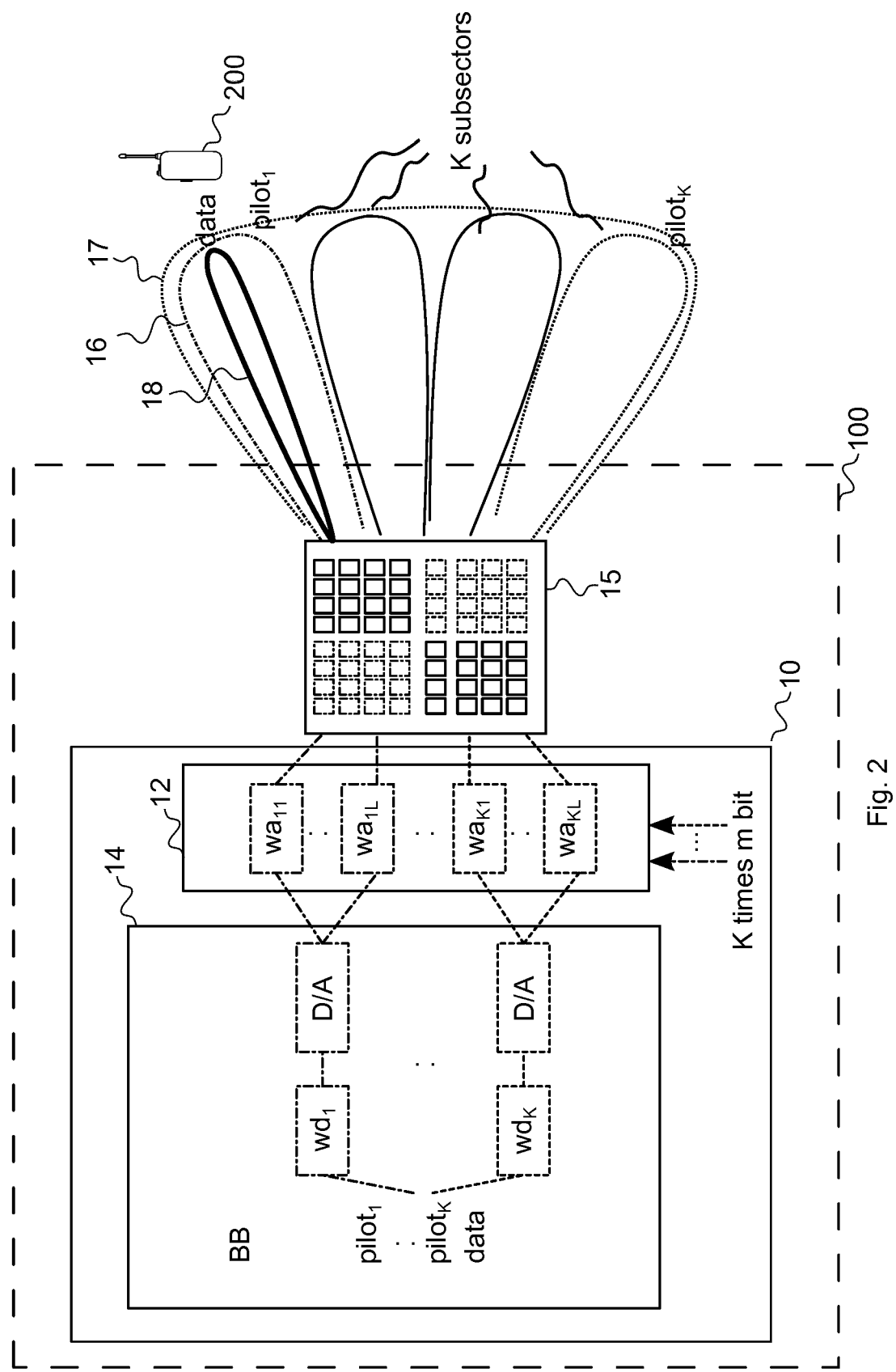
FIG. 2 illustrates a block diagram of an embodiment for a mmWave beamformer at a base station transceiver.

FIG. 2 illustrates a block diagram of a hybrid analog/digital BF transceiver with K digital paths, where each digital path is connected to a (disjoint) sub-array of L-antenna elements. In other words, in the embodiment depicted in FIG. 2 the plurality 15 of antenna elements is implemented as a field array of L×K antenna elements 15. Moreover, the plurality 15 of antenna elements is subdivided in subgroups, where to each of the subgroups it is also referred to as sub-array. In the embodiment depicted in FIG. 2 the transceiver module 12 comprises analog BF capability, where it may be assumed that independent analog BF can be applied within each sub-array, for transmission and reception of signals. In the present embodiment the control module 14 carries out digital BF, which is then applied using the sub-arrays. In FIG. 2 the control module 14 comprises one D/A converter per sub-array 1 . . . K, and it is assumed that the control module 14 applies adapted complex weights $wd_1 \ldots wd_K$ in the according paths. It is to be noted that the control module 14 may further be operable to control the analog BF at the transceiver module 14 to a certain extent. For example, the control module 14 or another control entity may be responsible to adjust analog BF weights, for example, by means of the K digital control interfaces, each having m bit; or to select input port(s) in case an analog Butler matrix is applied for analog BF.

The transceiver module 12 applies analog BF, which may, for example, be carried out by means of analog phase shifters or a Butler matrix. In other words, in the embodiment depicted in FIG. 2 the transceiver module 12 applies analog BF weights within each sub-array, to use each sub-array to form a certain beam, a set of beams, respectively. The according analog weight application is depicted in FIG. 2 by means of analog multiplication of the weights $wa_{11} \ldots wa_{KL}$ with the respective signal. In some embodiments hybrid digital/analog BF may be used as it may provide reduced complexity compared to fully digital BF implementations.

Moreover, FIG. 2 depicts the base station transceiver apparatus 10, i.e. it is assumed that the respective concept is applied at the base station transceiver 100. FIG. 2 further illustrates an individual antenna pattern 17, which is assumed to cover a sector of the base station transceiver 100. Moreover FIG. 2 illustrates the first beam pattern 16, for which one subgroup of the plurality 15 of antennas may be used, and an example of a second beam pattern 18, for which all antenna elements may be used in the present embodiment as will be detailed subsequently. As indicated in FIG. 2, different pilot signals may be used in the different subsectors, $pilot_1 \ldots pilot_K$. Moreover, data to an individual mobile transceiver 200 may be sent using the second beam pattern 18. Moreover, in an embodiment it is assumed that K=4 and L=16. It is assumed that each of the 64 transmit/receive antenna elements has 7 dBi element gain, that is to say 7 dBi sector gain for the individual antenna pattern 17.

Using all 64 transmit/receive antennas a 25 dBi pencil beam may be realized by the above described hybrid A/D BF involving all available antenna elements. Furthermore, it is assumed that all antenna elements illuminate the same sector, for example a 90°-sector. Further sub-sectorization can be implemented by digital BF while the analog beam forming uses pre-defined sector weights, for example K orthogonal/adjacent subsectors at the time as indicated in FIG. 1. Alternatively, these subsectors may be analogously formed by K times m bits provided to, for example, analog phase shifters in the transceiver module 12.

Embodiments may consider that with such high BF gains the acquisition procedure for a mobile transceiver 200 becomes more complex, as BF gains may be limited at the beginning of the acquisition procedure. Embodiments may therefore carry out acquisition by starting the transmission of a synchronization signal with reduced BF gain not using all transmit/receive antennas, and establishing full BF gain later on, when at least a first response signal is received from the mobile transceiver 200. Moreover, embodiments may introduce periodic acquisition time slots for downlink and uplink communication. The acquisition may be performed in multiple steps involving hierarchical sub-sectorization, which will be detailed subsequently. Moreover, embodiments may make use of subsector-specific random access preambles.

In embodiments, the control module 14 may be operable to transmit synchronization signals for multiple subsectors of the sector. That is to say, a synchronization signal may be subsector-specific or sector-specific. The control module 14 may be further operable to determine a subsector from the first set of beam patterns by evaluating a quality of a received signal from the mobile transceiver 200. For example, the control module 14 may determine a subsector from the first set of beam patterns, which provides a highest receive signal quality of the response signal of the mobile transceiver 200 and the control module 14 may be operable to select the subsector with the highest receive signal quality as the first beam pattern 16. In other words, the first beam pattern 16 may correspond to one subsector in a set of subsectors, as illustrated in FIG. 2. By evaluating the subsectors in the set, the control module 14 may determine and select the subsector with the best signal quality and select said subsector as first beam pattern 16. During the acquisition phase, only a part of the maximum BF gain may be realized. An example acquisition procedure will be described subsequently, where it is assumed that there is only a single antenna at the mobile transceiver 200. It is assumed that the base station transceiver 100 periodically transmits a digitally pre-coded synchronization signal in each subsector with an antenna gain of 13 dBi. As has already been mentioned above, alternatively, a more robust synchronization signal may be transmitted over a whole sector using a wider beam, however, with accordingly reduced antenna gain.

The mobile transceiver 200 may receive a trigger or trigger signal to perform subsequent steps. Such a trigger may correspond to an event at the mobile transceiver 200, for example, data is to be transmitted, a number is dialed by a user of the mobile transceiver 200, etc. Another trigger may be a paging signal, which is received by the mobile transceiver 200. For example, an incoming call for the mobile transceiver 200 or data is to be transmitted to the mobile transceiver 200. Such a trigger may be received from the base station transceiver 100, e.g. on a Paging CHannel (PCH), it may be received from a different base station transceiver, e.g. from a different system, and/or it may be received on a different frequency carrier. For example an inter-system or inter-frequency handover may have been initiated in another system or on another frequency. The mobile transceiver 200 may further receive configuration information on which radio resources or code resources, frequency carrier etc. should be used to receive a synchronization channel and/or to respond to or access (e.g. random access information) the system or base station transceiver 100. For example such information may be provided on a Broadcast CHannel (BCH).

The mobile transceiver 200 then searches for the periodic synchronization signal and establishes downlink synchronization with the base station transceiver 100. In other words, the mobile transceiver 200 receives the synchronization signal and determines boundaries of a radio frame pattern, which will be used subsequently for communicating with the base station transceiver 100. The mobile transceiver 200 then transmits a Random Access Preamble (RAP) on pre-defined radio resources. In some embodiments these radio resources are pre-defined on a sector or cell basis, in other embodiments these radio resources may be defined on a subsector basis. The base station transceiver 100 scans for the RAP in parallel in each subsector. If RAP is detected on one or more multiple subsectors the base station transceiver 100 selects the subsector with the strongest RAP-signal and triggers/transmits a Random Access Response (RAR) in this subsector. It is to be noted, that in the present embodiment it is assumed that downlink and uplink subsectors would be the same. In some other embodiments, it may be assumed that downlink and uplink subsectors can as well be different, any open loop or closed loop concepts may then be used for assigning a mobile transceiver to the respective sector/subsector in the uplink and the downlink.

The RAR may include information for uplink timing adjustments or for the assignment of a mobile transceiver ID. The mobile transceiver 200 may then detect RAR and may start transmitting at least a pilot signal. The base station transceiver 100 may receive the pilot signal on the selected subsector and may then select the best weights for analog BF. This may be done by consecutively receiving the pilot signal on each of the four analog beams of a subsector, for example, by switching through the four analog beams. Such a switching may be achieved by selecting different inputs of a Butler matrix or by using different weights for a corresponding phase shifter structure in a sub-array, which may include transmitting the pilot signal over at least four time units or time slots by the mobile transceiver 200. Once the best analog beam pattern, e.g. a pattern with 19 dBi antenna gain, has been selected by the base station transceiver 100, the pilot signal can be used to fine tune the digital weights to obtain a 25 dBi pencil beam. In other words, in this embodiment the pilot signal transmitted by the mobile transceiver 200 is used to fine tune the beam pattern, and the first beam pattern 16 may correspond to a sector or a subsector by transmission of the synchronization signal, where the second beam pattern 18 is then formed based on the received pilot signal from the mobile transceiver 200.

In other words, in the embodiment above, the control module 14 of the base station transceiver apparatus 10 is operable to receive a RAP signal from the mobile transceiver 200 using the first beam pattern 16. The control module 14 is further operable to transmit a RAR to the mobile transceiver 200 using the first beam pattern 16 and to receive a pilot signal from the mobile transceiver 200. The control module 14 is further operable to determine the second beam pattern 18 based on the pilot signal and to transmit a subsequent signal using the second beam pattern 18. In another embodiment the mobile transceiver 200 may repeat the RAP transmission until the base station transceiver 100 has selected the weights of digital and analog beam forming. The base station transceiver 100 may then transmit the RAR with full BF gain.

In a further embodiment, the RAP resources are defined for a subsector and the mobile transceiver 200 selects the best subsector based on the received synchronization/pilot signals. The mobile transceiver 200 may then transmit a subsector-specific RAP. In other words, the control module 14 may be operable to receive one or more RAP signals from the mobile transceiver using the first beam pattern 16. The control module 14 may be further operable to determine the second beam pattern 18 based on the one or more RAP signals. The control module 14 may then be operable to transmit a RAR to the mobile transceiver 200 using the second beam pattern 18. In other words, in some embodiments full BF gain may already be achieved for transmitting the RAR.

Both of the above embodiments may allow the base station transceiver 100 to transmit data and control information to the mobile transceiver 200 with full beam forming gain. Likewise the base station transceiver 100 may receive data and control information from the mobile transceiver 200 with full BF gain. The mobile transceiver 200 may continue to transmit some uplink pilot signal such that the base station transceiver 100 is enabled to update the BF weights.

For example, the transceiver module 12 may be operable to use analog BF to form the first beam pattern 16. The control module 14 may then be operable to use digital BF to form the second pattern 18. In other embodiments the transceiver module 12 may be operable to use analog BF to form the first beam pattern 16 and the second beam pattern 18. The control module 14 may then be operable to select a beam pattern at the transceiver module 12. In other words the transceiver module 12 may be operable to carry out analog BF, for example, by means of a Butler matrix or by means of analog phase shifters, where an input for adjustment of such a phase shifter may be provided digitally. The transceiver module 12 may then provide a number of analogously formed beams for the control module 14 to select from. In some embodiments the control module 14 may accordingly be operable to carry out fixed beam switching, where the beams are fixed and provided by the transceiver module 12. The term "fix" shall indicate, that the BF cannot be adapted on a short time schedule or frame, such as per radio frame or per radio slot, but rather on a longer time scale, such as 1 s, 2 s, 5 s, etc. Such adaptation may then for example be carried out by providing adapted digital weights to the analog phase shifters. In other embodiments, the beams may actually be predefined and fix.

In further embodiments the control module 14 may be operable to receive the response signal to the synchronization signal from a mobile transceiver 200 using the transceiver module 12 in a first pre-defined time slot relative to the synchronization signal. The control module 14 may be further operable to transmit control data specific to the mobile transceiver 200 using the transceiver module 12 in a second pre-defined time slot different from the first time slot.

Figure 3:
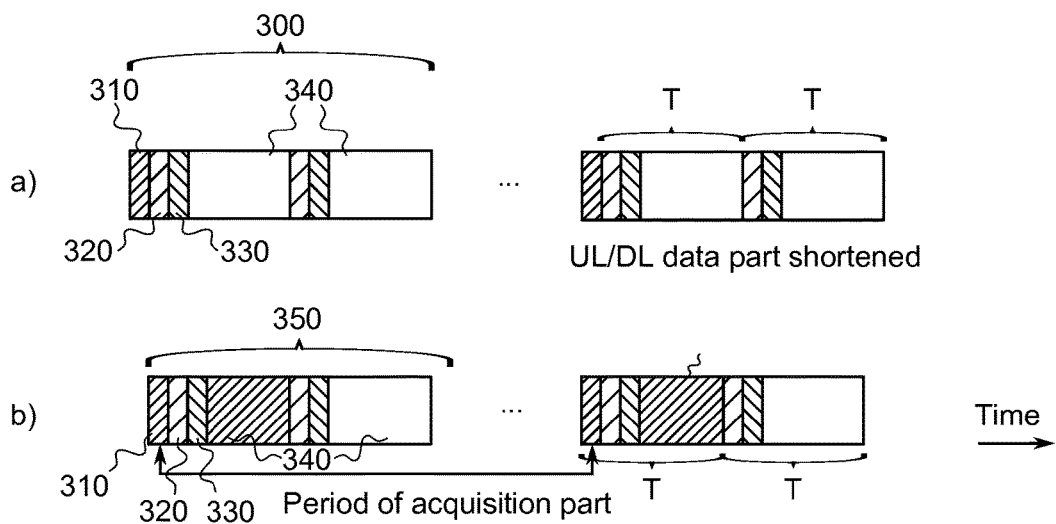
FIG. 3 illustrates a downlink timing diagram of an embodiment.

A time slot or frame structure as it may be used in one embodiment is depicted in FIG. 3. FIG. 3 shows downlink timing diagrams with periodic acquisition time slots. FIG. 3 shows a first embodiment of a frame structure at the top, wherein radio frame 300 comprises an acquisition part 310, an uplink control part 320, a downlink control part 330, and uplink/downlink data parts 340. As indicated in FIG. 3, uplink/downlink control and data parts 320, 330 and 340 are repeatedly transmitted in one frame, wherein the acquisition part 310 is concatenated at the beginning of the entire frame. Moreover, as can be seen from the example in FIG. 3 at the top, the duration of the uplink/downlink data and control part plus one of uplink/downlink data part equals T. Another example of an embodiment is shown at the bottom of FIG. 3. At the bottom of FIG. 3 another radio frame 350 is illustrated, which also comprises an acquisition part 310, an uplink control part 320, a downlink control part 330, and uplink and downlink data parts 340, where in this embodiment a data part is shortened to allow transmission of the acquisition part 310. In other words, in the second embodiment at the bottom of FIG. 3, the acquisition part 310 is transmitted with a certain period, and when it is transmitted the subsequent data part 340 is shortened, such that acquisition part 310, uplink control part 320, downlink control part 330 and shortened data part 340 have a duration of T.

Hybrid analog/digital BF may use Time Division Multiplexing (TDM) to separate acquisition and transmission of user-specific control and data. As shown in FIG. 3, periodic acquisition time slots 310 in the downlink and uplink may be used. In an embodiment the transceiver as depicted in FIG. 2 may be used, and during acquisition time slots 310 the analog BF may use pre-defined sector weights, and pure digital BF may be applied. FIG. 3 depicts a sub-frame structure for (dynamic) TDM, comprising parts of uplink control 320, downlink control 330 and uplink/downlink data 340, wherein each part comprises one or multiple symbols, separated in the time domain, as shown in FIG. 3. The embodiment at the top of FIG. 3 assumes a fix duration T of the parts for uplink control 320, downlink control 330, and uplink/downlink data 340. Downlink acquisition parts 310 are periodically inserted. The example at the bottom of FIG. 3 assumes that the period of downlink acquisition time slots 310 is an integer multiple of T, achieved by shortening some uplink/downlink data parts 340, for example, the first uplink/downlink data part following a downlink acquisition part.

In some embodiments the control module 14 may be operable to iteratively determine the second beam pattern 18 by subsequently evaluating increasingly narrower beams. This is a concept which may also be referred to as hierarchical BF. In other words the control module 14 may be operable to first evaluate a set of beams with a rather low number of beams and with beams having lower gain, and then, subsequently, evaluate a set with a higher number of beams with higher gains. For example, the control module 14 may check two beams covering a sector, select one of the two beams, and then evaluate two narrower beams covering the selected beam, and so on.

Figure 4:
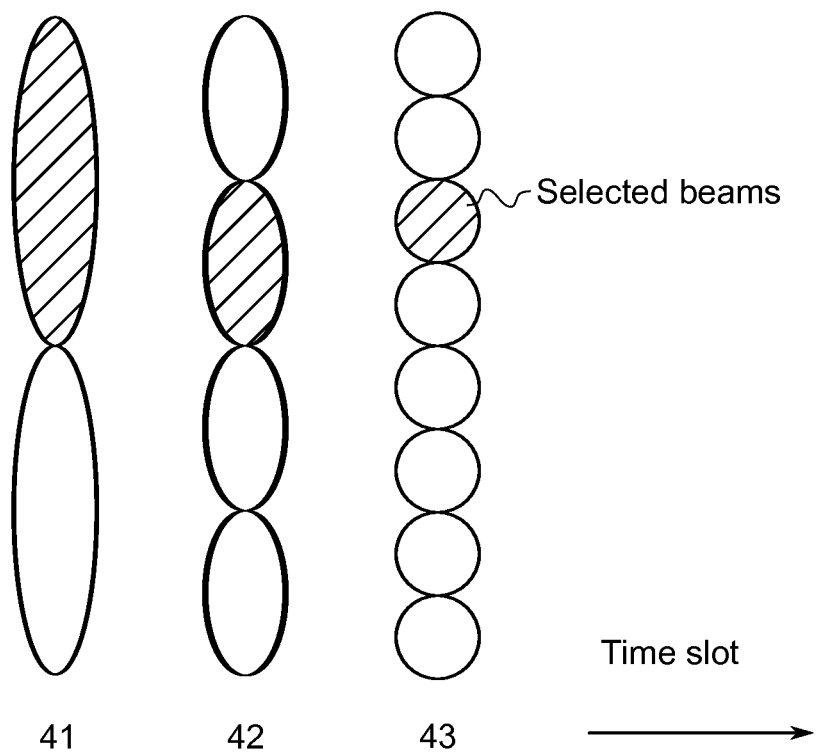
FIG. 4 illustrates hierarchical sub-sectorization in an embodiment.

FIG. 4 illustrates an embodiment using hierarchical beam search, as it may be carried out in some embodiments of the control module 14. FIG. 4 illustrates a sequence of a beam search, subdivided in three steps 41, 42 and 43. In the first step 41 two wide beams are evaluated, in the second step 42 in the area of the wide beams selected in step 1, two narrower beams are evaluated, one of which is then selected. The now-selected beam is then reevaluated in step 43, where even narrower beams are considered now in the area of the beam selected in step 42. FIG. 4 illustrates such a method in three subsequent time slots, the best out of eight pencil beams shown in step 43 can be selected in three steps or three time slots.

As has been explained above, the acquisition phase may be relevant not only to set up a beamformed link, but also to adapt the BF weights in case of user movements or in case some transmission paths get blocked. This is also illustrated in FIG. 4. In the following embodiment a pure analog BF will be considered, for example with sixteen beams and using a single digital path. In an embodiment, to find the best beam, one way forward would be to scan all sixteen beams, one at the time, for example based on the above described uplink pilot signal of a user or mobile transceiver 200. In such an embodiment, sixteen time slots may be used to find the best beam, using subsequent evaluation. In some embodiments using an approach similar to an analog butler matrix, only one beam may be measured at the time as only a single digital path may be available.

Some embodiments may use the faster technique, which may be also referred to sub-sectorization. In such embodiments the control module 14 may select the best out of four subsectors, one subsector at the time, and then select the best beam per subsector. This may reduce the selection time to eight time slots. As is illustrated in FIG. 4 and as explained above, yet faster technique used by some embodiments may be referred to as hierarchical sub-sectorization. In a first time slot 41 two sectors are introduced and the best one is selected. In a second time slot 42 four subsectors are defined, two of which lie in the sector that has been selected in step 41. The best out of these two may now be selected as basis for subsequent steps. The subsequent steps, one of which is exemplified by step 43 in FIG. 4, the selected subsector of the previous step 42 is further subdivided in two more narrower subsectors, of which the best one is now selected. In a last time slot the best beam is selected from a small subset of beams. In an example with sixteen beams, this procedure may only need four time slots.

In embodiments similar procedures may be applied also in conjunction with hybrid digital/analog BF. For example, assume that for the transceiver 100 depicted in FIG. 2, K=4 subsectors are defined by means of pure digital BF, i.e. 4 subsectors can be processed concurrently in uplink which requires a minimum of one time slot. Once the best subsector is selected, the best out of four beams within the subsector may be determined. This may be done beam by beam, or by using hierarchical sub-sectorization. Hierarchical sub-sectorization may likewise be used with pure digital BF and may reduce computational complexity as compared to concurrently scanning a large number of beams.

In some embodiments subsector-specific RAP may be used. Embodiments may, in line with the above description, define subsectors for downlink transmission by means of subsector-specific synchronization or pilot signals, which may enable to define subsector-specific RAR in the downlink and/or RAP in the uplink. Embodiments may provide the advantage that the acquisition speed or efficiency may be increased in that the mobile station 200 determines the best subsector from downlink measurements and indicates its selection by means of a subsector-specific RAP in the uplink. Embodiments may enhance the capacity for RA by exploiting SDMA on orthogonal beams, for example by a factor of K.

In a further embodiment, a primary synchronization signal carrying a cell identification may be broadcast during a downlink acquisition part over the whole sector, and K secondary synchronization signals carrying subsector identifications may be transmitted over the K subsectors, for example, concurrently by means of digital beam forming. The mobile transceiver 200 may then detect the cell identification, select the best received subsector synchronization signal, and based on the selected subsector, it may transmit a RAP from a set defined for the subsector, for example a set of Zadoff-Chu sequences. In some embodiments a per subsector RA could also be applied in conventional cellular communication systems, for example, in a WCDMA system, in which the scrambling codes for a RA generation could be derived from the secondary scrambling codes.

Figure 5:
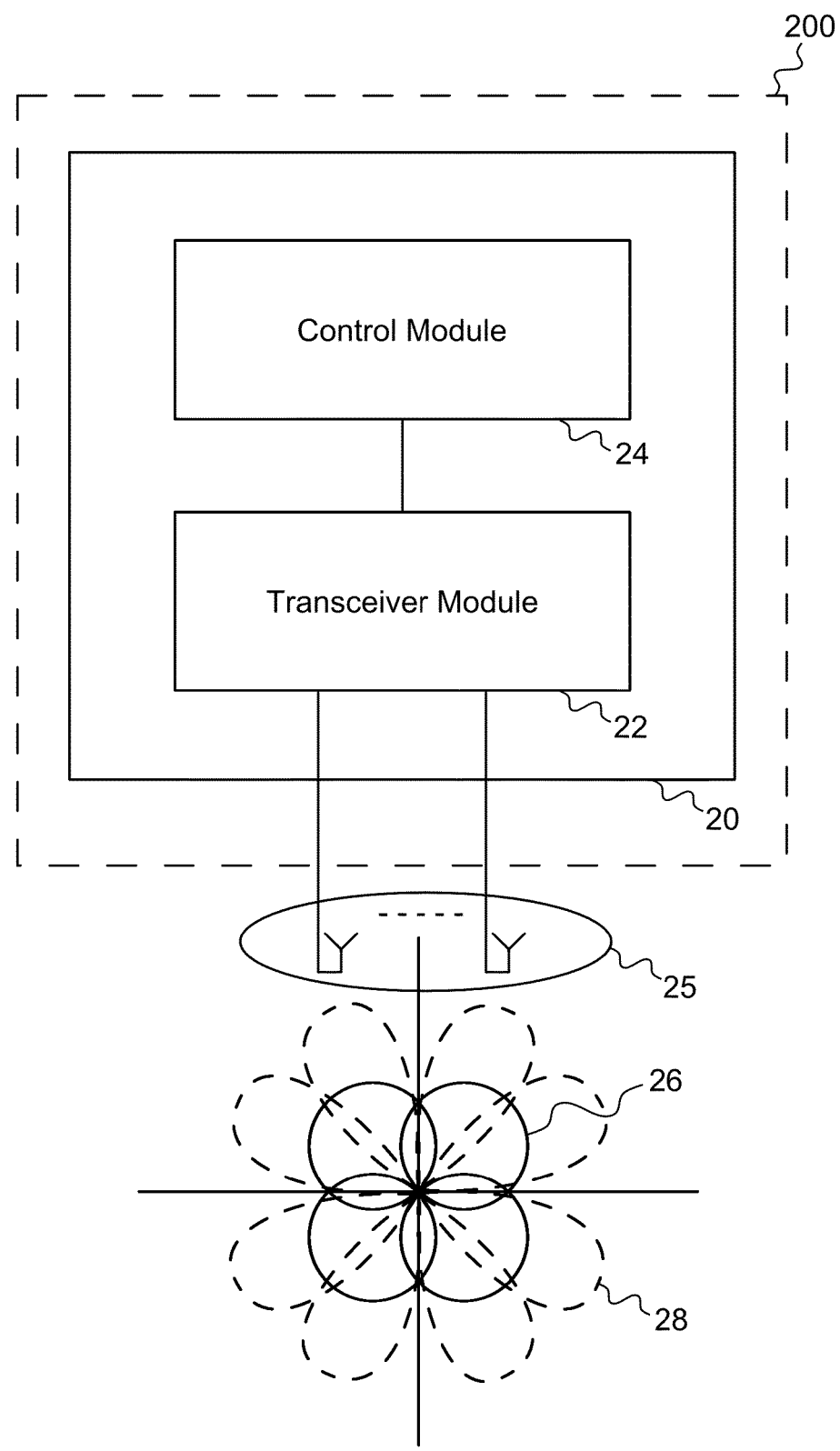
FIG. 5 illustrates a block diagram of an embodiment of an apparatus for a mobile transceiver.

FIG. 5 illustrates an embodiment of an apparatus 20 operable in a mobile transceiver 200 of a mobile communication system. In other words, the apparatus 20 may be adapted to or operable in a mobile transceiver 200; and may be operated or comprised in a mobile transceiver 200. Embodiments also provide a mobile transceiver 200 comprising the apparatus 20. FIG. 5 further shows an embodiment (dashed lines) of a mobile transceiver 200 comprising the apparatus 20. The apparatus 20 comprises a transceiver module. The transceiver module 22 may correspond to a similar transceiver module as described above, however, adapted to a mobile transceiver 200, comprising the above described typical transceiver components. In a similar manner, the transceiver module 22 may be implemented as one or more transceiver devices, one or more transceiver units, any means for transceiving, i.e. receiving and/or transmitting etc. The transceiver module 22 comprises interfaces to a plurality of antennas 25, which may correspond to transmit and/or receive antennas 25. With respect to the interfaces it is referred to the above described interfaces as well. The transceiver module 22 is coupled to a control module 24. The control module 24 is operable to determine a first set of beam patterns 26 based on the plurality of transmit/receive antennas 25. The control module 24 is operable to receive a signal from a base station transceiver 100 using a first beam pattern from the first set of beam patterns 26 using the transceiver module 22. The control module 24 is further operable to determine a second set of beam patterns 28 based on the plurality of transmit/receive antennas 25. As indicated in FIG. 5 the second set of beam patterns 28 comprises more beam patterns than the first set of beam patterns 26. The control module 24 is further operable to transmit a signal to the base station transceiver 100 using the second beam pattern 28 and using the transceiver module 22.

As has already been described above, the control module 24 may be operable to receive a synchronization signal as the signal from the base station transceiver 100 and to determine information related to radio resources for transmission of a RAP based on the synchronization signal. The control module 24 may then be operable to transmit a RAP to the base station transceiver 100 using the radio resources determined based on the synchronization signal. In other words, the synchronization signal may determine the radio resources, be it transmitted sector-wide or subsector-wide. In further embodiments the control module 24 may be operable to receive a synchronization signal as the signal from the base station transceiver 100 using the first beam pattern from the first set of beam patterns 26 and using the transceiver module 22. The control module 24 may be further operable to transmit a RAP to the base station transceiver 100 using the second beam pattern from the second set of beam patterns 28 and using the transceiver module 22.

In other words, the mobile transceiver 200 may use multiple transmit/receive antennas 25. The processing of the synchronization signal may be performed in parallel for a small number of (pre-defined) receive beams, for example, four receive beams when assuming four digital paths at the mobile transceiver 200, similar to what is illustrated in FIG. 2. The four beams may then correspond to the first set of beam patterns 26. If downlink synchronization has been established, the mobile station 200 may use a larger set (larger than four) receive beams, that is to say a second set of beam patterns 28, to fine-tune the weights for digital BF. This fine-tuning may be carried out periodically by the mobile transceiver 200 to maintain synchronization in time/frequency/spatial domains. The fine-tuned BF weights may then be applied by the mobile transceiver 200 for transmission and reception, for example to receive RAR, and to transmit RAP, uplink pilot signals, etc.

In further embodiments the control module 24 may be operable to receive a synchronization signal as the signal from the base station transceiver 100 using the first beam pattern from the first set of beam patterns 26 and using the transceiver module 22. The control module 24 may further be operable to transmit a RAP to the base station transceiver 100 using the first beam pattern and using the transceiver module 22. The control module 24 is then further operable to receive a RAR using the first beam pattern and using the transceiver module 22, and to transmit a pilot signal using the second beam pattern and using the transceiver module 22.

Figure 6:
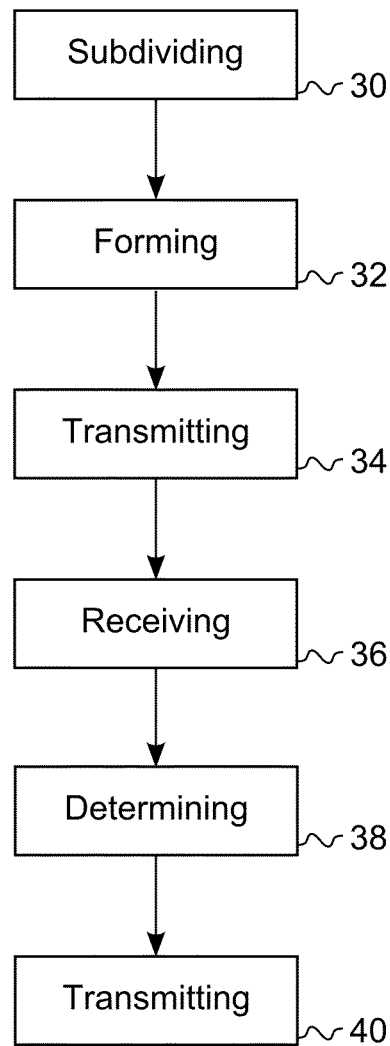
FIG. 6 illustrates a block diagram of a flow chart of an embodiment of a method for a base station transceiver.

FIG. 6 illustrates a block diagram of an embodiment of a method for a base station transceiver of a mobile communication system. The method comprises subdividing 30 a plurality of antennas 15 in a plurality of subgroups and forming 32 a first beam pattern 16 using one or more antennas as subgroup. The method further comprises transmitting 34 a synchronization signal using the first beam pattern 16 and receiving 36 a response signal after transmission of the synchronization signal from a mobile transceiver 200. The method further comprises determining 38 a second beam pattern 18 based on the response signal from the mobile transceiver 200 and transmitting 40 a signal to the mobile transceiver 200 using the second beam pattern 18. The second beam pattern 18 has a higher antenna gain than the first beam pattern 16.

Figure 7:
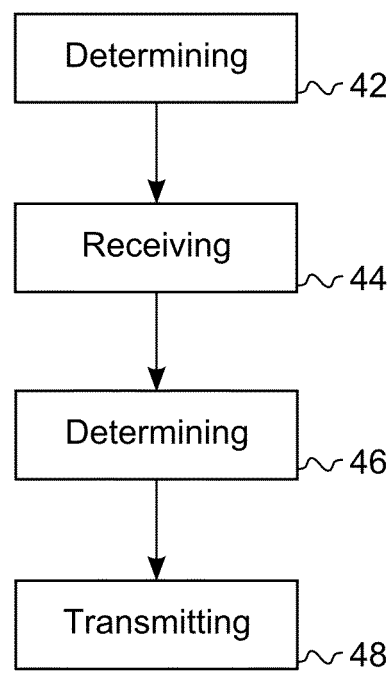
FIG. 7 illustrates a block diagram of a flow chart of an embodiment of a method for a mobile transceiver.

FIG. 7 illustrates a block diagram of an embodiment of a method for a mobile transceiver 200 of a mobile communication system. The method comprises determining 42 a first set of beam patterns 26 based on a plurality of antennas 25. The method further comprises receiving 44 a signal from a base station transceiver 100 using a first beam pattern from the first set of beam pattern 26. The method further comprises determining a second set of beam patterns 28 based on the plurality of antennas 25. The second set of beam patterns 28 comprises more beam patterns than the first set of beam patterns 26. The method further comprises transmitting 48 a signal to the base station transceiver 100 using the second beam pattern from the set of second beam patterns 28.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", "means for transceiving", "means for controlling", etc., may be provided through the use of dedicated hardware, such as "a transceiver", "a controller/processor", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

The invention claimed is:

1. An apparatus operable in a base station transceiver of a mobile communication system, the apparatus comprising:
 a transceiver module comprising interfaces to a plurality of antennas and operable to:
  subdivide the plurality of antennas in a plurality of subgroups using the interfaces, and
  form a first beam pattern using one or more antennas of a subgroup, wherein the transceiver module is operable to use analog beamforming to form the first beam pattern; and
a control module operable to:
transmit a synchronization signal using the transceiver module and the first beam pattern,
receive a random access preamble signal from a mobile transceiver using the first beam pattern,
transmit a random access response to the mobile transceiver using the first beam pattern,
receive a pilot signal as a response signal after transmission of the synchronization signal from the mobile transceiver using the transceiver module,
determine a second beam pattern based on the response signal from the mobile transceiver, the second beam pattern having a higher antenna gain than the first beam pattern, and
transmit a subsequent signal to the mobile transceiver using the second beam pattern and the transceiver module;
wherein the base station transceiver scans for the random access preamble in parallel in each subsector, and if the random access preamble is detected on one or more of the multiple subsectors, then the base station transceiver selects the subsector with the strongest random access preamble-signal and transmits the random access response in this subsector.

2. The apparatus of claim 1, wherein the second beam pattern uses more antennas than the first beam pattern.

3. The apparatus of claim 1, wherein an antenna uses an individual beam pattern covering a sector of the base station transceiver,
wherein the transceiver module is operable to form a first set of beam patterns comprising subsectors covering the sector and wherein the first beam pattern corresponds to a subsector, and/or
wherein the first beam pattern corresponds to a subsector of the sector, and
wherein the control module is operable to transmit the synchronization signal using the individual beam pattern of the antenna or the first beam pattern.

4. The apparatus of claim 3, wherein the control module is operable to transmit synchronization signals for multiple subsectors of the sector, and/or wherein the control module is operable to determine a subsector from the first set of beam patterns, which provides a highest receive signal quality of the response signal of the mobile transceiver and wherein the control module is operable to select the subsector with the highest receive signal quality as the first beam pattern.

5. The apparatus of claim 1, wherein the control module is operable to:
receive one or more random access preamble signals from the mobile transceiver using the first beam pattern,
determine the second beam pattern based on the one or more random access preamble signals, and
transmit a random access response to the mobile transceiver using the second beam pattern.

6. The apparatus of claim 1, wherein the control module is operable to use digital beamforming to form the second beam pattern, or wherein the transceiver module is operable to use analog beamforming to form the first beam pattern and the second beam pattern, wherein the control module is operable to select a beam pattern at the transceiver module.

7. The apparatus of claim 1, wherein the control module is operable to iteratively determine the second beam pattern by subsequently evaluating increasingly narrower beam patterns, and/or wherein the control module is operable to receive the response signal to the synchronization signal from a mobile transceiver using the transceiver module in a first predefined time slot relative to the synchronization signal, and wherein the control module is operable to transmit control data specific to the mobile transceiver using the transceiver module in a second predefined time slot different from the first time slot.

8. An apparatus operable in a mobile transceiver of a mobile communication system, the apparatus comprising
a transceiver module comprising interfaces to a plurality of antennas; and
a control module operable to:
determine a first set of beam patterns based on the plurality of antennas, receive a synchronization signal from a base station transceiver using a first beam pattern from the first set of beam patterns using the transceiver module,
determine a second set of beam patterns based on the plurality of antennas, the second set of beam patterns comprising more beam patterns than the first set of beam patterns,
determine information related to radio resources for transmission of a random access preamble based on the synchronization signal, and
transmit a random access preamble to the base station transceiver using a second beam pattern from the set of second beam patterns, using the transceiver module, and using the radio resources determined based on the synchronization signal;
wherein the mobile station determines a best subsector from downlink measurements and indicates its selection by means of a subsector-specific random access preamble in the uplink.

9. The apparatus of claim 8, wherein the control module is operable to:
receive a synchronization signal as the signal from a base station transceiver using the first beam pattern from the first set of beam patterns using the transceiver module, and
transmit a random access preamble to the base station transceiver using the second beam pattern and using the transceiver module.

10. The apparatus of claim 8, wherein the control module is operable to:
receive a synchronization signal as the signal from a base station transceiver using the first beam pattern from the first set of beam patterns using the transceiver module,
transmit a random access preamble to the base station transceiver using the first beam pattern and using the transceiver module, and
receive a random access response using the first beam pattern and using the transceiver module, and
transmit a pilot signal using the second beam pattern and using the transceiver module.

11. A method for a base station transceiver of a mobile communication system, the method comprising
subdividing a plurality of antennas in a plurality of subgroups;
forming a first beam pattern using antennas of a subgroup and using analog beamforming;
transmitting a synchronization signal using the first beam pattern;
receiving a random access preamble signal from a mobile transceiver using the first beam pattern,
transmitting a random access response to the mobile transceiver using the first beam pattern, receiving a pilot signal as a response signal after transmission of the synchronization signal from the mobile transceiver;

determining a second beam pattern based on the response signal from the mobile transceiver;

transmitting a subsequent signal to the mobile transceiver using the second beam pattern, the second beam pattern having a higher antenna gain than the first beam pattern;

scanning at the base station transceiver for the random access preamble in parallel in each subsector, and if the random access preamble is detected on one or more of the multiple sub sectors, then the base station transceiver selects the subsector with the strongest random access preamble-signal and transmits the random access response in this subsector.

12. A method for a mobile transceiver of a mobile communication system, the method comprising determining a first set of beam patterns based on a plurality of antennas;

receiving a synchronization signal from a base station transceiver using a first beam pattern from the first set of beam patterns;

determining a second set of beam patterns based on the plurality of antennas, the second set of beam pattern comprising more beam patterns than the first set of beam patterns;

determining information related to radio resources for transmission of a random access preamble based on the synchronization signal; and transmitting a random access preamble to the base station transceiver using a second beam pattern from the set of second beam patterns and using the radio resources determined based on the synchronization signal;

wherein the mobile station determines a best subsector from downlink measurements and indicates its selection by means of a subsector-specific random access preamble in the uplink.

13. A non-transitory computer readable medium having thereon a program code for performing the method of claim 11, when the program code is executed on a computer, a processor, or a programmable hardware component.

* * * * *